3,301,870
METALLOCHROMIC INDICATORS AND METHOD OF PRODUCING SAME
Drahomira Terzijska, 1 Bartosova; and Vlastimil Svoboda, 10 Vlhka, both of Brno, Czechoslovakia; and Jiri Körbl, 1327 Zdenka Nejedleho, Lysa nad Labem, Czechoslovakia
No Drawing. Filed Sept. 19, 1960, Ser. No. 56,632
Claims priority, application Czechoslovakia, Aug. 17, 1957, 2,844/57; Sept. 18, 1957, 3,338/57
8 Claims. (Cl. 260—326.3)

This application is a continuation-in-part of our copending applications Serial No. 754,501, filed August 11, 1958, and Serial No. 760,830, filed September 15, 1958, both now abandoned.

The present invention relates to new metallochromic indicators and to methods of producing the same, and more particularly to sulfonphthalein and phenolphthalein derivatives which have outstanding properties as metallochromic indicators, that is with metal ions they form soluble, undissociated colored compounds.

The known phthalein derivative dyestuffs while being extremely sensitive as indicators can only be used to a limited extent because of their slight specificity, that is due to the fact that their color changes are caused by any one of several different ions.

It is accordingly a primary object of the present invention to provide for the production of new metallochromic indicators of the sulfonphthalein and phenolphthalein dye groups which exhibit marked color change with various different cations and which accordingly can be used as metallochromic indicators for qualitative, volumetric and colorimetric analysis.

It is another object of the present invention to provide for the production of an entire group of sulfonphthalein and phenolphthalein derivatives which form chelates with various cations under marked color change and which can accordingly be used as indicators for such ions, the group of indicators of the present invention giving selective color changes with different ions which are adjustable within certain limits by adjusting the substituents of the derivatives within the limits of the present invention so that the compounds can be used for many different ions.

It is yet another object of the present invention to provide a group of metallochromic dye indicators which have the advantage of high specificity combined with an unusual sensitivity and a brilliant, easily observable change in color.

The present invention also comprises among its objects the methods of producing the new metallochromic indicators of the invention.

Other objects and advantages of the present invention will be apparent from a further reading of the specification and of the appended claims.

With the above objects in view, the present invention mainly comprises as new metallochromic indicators a compound of the formula:

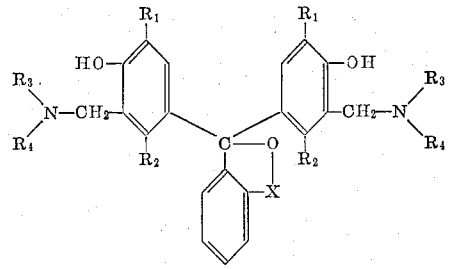

wherein X is selected from the group consisting of CO and $SO_2$, wherein $R_1$ and $R_2$ are each selected from the group consisting of hydrogen and alkyl of up to 4 carbon atoms, wherein $R_3$ is selected from the group consisting of hydrogen, alkyl of 1–4 carbon atoms, alkCOOH wherein alk is an alkyl of 2–4 carbon atoms, $RSO_3H$, ROH and RSH wherein R is an alkyl of 1–4 carbon atoms, wherein $R_4$ is selected from the group consisting of RCOOH, $RSO_3H$, ROH and RSH wherein R has the same definition as above when $R_3$ is other than hydrogen, wherein $R_4$ is selected from the group consisting of

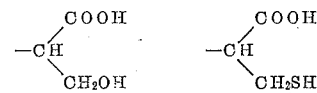

alkCOOH, $RSO_3H$, ROH and RSH wherein alk and R have the same definitions as above when $R_3$ is hydrogen, and wherein $R_3$ and $R_4$ together are selected from the group consisting of 4 and 5 carbon atom alkylene radicals substituted by a radical selected from the group consisting of COOH, $SO_3H$, OH and SH. Actually, in the case of "R" and "alk," the same cannot truly be designated as "alkyl" because they are linked to the N-atom as well as to the "COOH" radical or the "OH" radical or the "SH" radical. It is therefore more proper to use the designation that alk is $(C_nH_{2n})$ wherein $n$ is a whole number from 2–4, and R is $(C_{n'}H_{2n'})$ wherein $n'$ is a whole number from 1–4.

The present invention is directed to the production of sulfonphthalein derivatives of the following general formula:

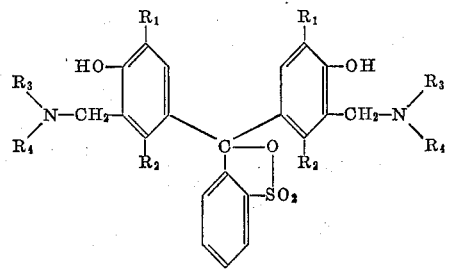

wherein $R_1$, $R_2$, $R_3$ and $R_4$ will have the same definitions as above, and phthalein derivatives of the following general formula:

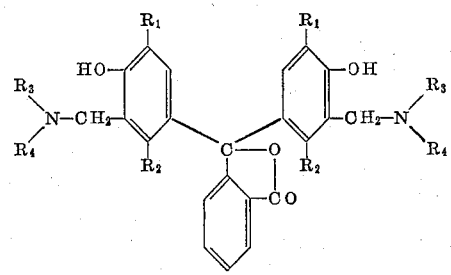

wherein $R_1$, $R_2$, $R_3$ and $R_4$ all have the same definitions as above and fluorescein derivatives of the following general formula:

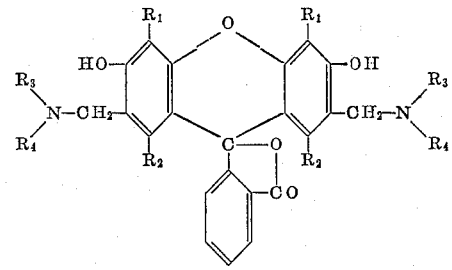

wherein $R_1$, $R_2$, $R_3$ and $R_4$ all have the same definitions as above.

As indicated above, $R_1$ in the formulas may be hydrogen or a lower alkyl. Preferably $R_1$ is hydrogen or isopropyl or methyl. Likewise, $R_2$ may be hydrogen or a lower alkyl. Preferably $R_2$ is hydrogen or methyl. The substituent $R_3$ may be hydrogen, lower alkyl, alkCOOH wherein alk is an alkyl of 2–4 carbon atoms, $RSO_3H$, ROH or RSH wherein R is a lower alkyl of up to 4 carbon atoms. Most preferably $R_3$ is methyl, hydrogen, or $—CH_2—CH_2—COOH$. The substituent $R_4$ may be $RCOOH, RSO_3H$, ROH or RSH wherein R has the same definition as above when $R_3$ is other than hydrogen. In such case, $R_4$ is most preferably $—CH_2COOH$, or $—CH_2—CH_2—COOH$. When $R_3$ is hydrogen, then $R_4$ may be alkCOOH, $RSO_3H$, ROH or RSH wherein alk and R have the same definitions as above or $R_4$ may be:

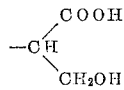

or

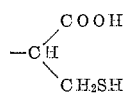

or alkCOOH wherein alk is isobutyl, or $—CH_2—CH_2—$.

In addition, $R_3$ and $R_4$ together may be a 4- or 5-carbon atom alkylene radical substituted by a radical such as COOH, $SO_3H$, OH or SH. In such case, for example, $R_3$ and $R_4$ together may be a radical of the formula:

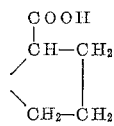

The compounds of the present invention may be produced by condensing a phthalein derivative of the formula:

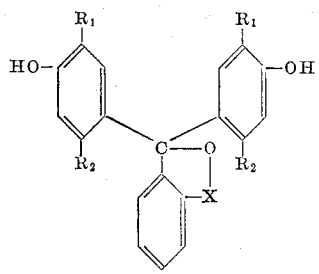

wherein X, $R_1$ and $R_2$ have the same definitions as above with a substance selected from the group consisting of formaldehyde and paraformaldehyde and with an amino compound of the formula $NHR_3R_4$ wherein $R_3$ and $R_4$ have the same definitions as above at a temperature above room temperature and up to 100° C.

The condensation is most preferably carried out at a temperature of about 60–100° C. and in the presence of alkali metal cations, such as sodium or potassium ions. The alkali metal cations may be brought into the reaction mixture in the form of an alkali metal hydroxide or an alkaline reacting salt, as for example sodium carbonate, potassium carbonate, sodium acetate, potassium acetate, or the like.

The reaction is also preferably carried out in the presence of a lower carboxylic acid, most preferably in the presence of acetic acid in the form of glacial acetic acid. It may be seen from the above that the reaction can take place in alkaline, neutral or acidic medium. Most preferably, the reaction takes place in a buffered acidic medium, for example, in a medium of acetic acid with sodium acetate. An aqueous medium may be used for the condensation reaction or a medium of water mixed with an organic solvent or in a medium of an organic solvent alone, as for example an alcohol, preferably a lower alcohol such as ethanol, acetone, dioxane, acetic acid or the like.

The condensation reaction may be carried out by one of several different procedures. For example, it is possible to mix all three basic components together and to condense the same simultaneously. It is also possible to first prepare the methylol compound by first reacting formaldehyde or paraformaldehyde with one or the other component and then to condense this methylol compound with the remaining component. It is also possible to first prepare the halogenmethyl derivative of the parent phthalein or sulfonphthalein dye or of the amino compound and then to condense this halogenmethyl derivative with the remaining component. It is also possible to carry out the condensation with an intermediate product or a raw material of the dye and to complete the synthesis with the condensation product thus obtained.

The isolation of the final product, that is the substituted phthalein or sulfonphthalein dyestuff, from the reaction mixture is preferably achieved in such manner that the mixture, after partially or fully distilling off the reaction medium, is diluted with a lower aliphatic alcohol such as ethanol, whereupon the alkali metal salt of the dyestuff is separated out by adding a water miscible solvent such as acetone, dioxane, tetrahydrofurane or the like.

The condensation products which do not form alkali metal salts in the reaction mixture are preferably isolated in such manner that the reaction solution, after the completion of the condensation, is introduced under stirring into a large quantity of water, thus separating the substituted phthalein or sulfonphthalein dyestuff in an insoluble form. In those cases wherein the condensation results in products of varying properties, it is possible to achieve a complete separation by combining both of the above set forth isolation methods.

The substituted dyestuffs thus obtained form chelates with various cations under marked color change, the selectivity in respect to the different ions being adjustable within certain limits by altering the substituents $R_3$ and $R_4$. As a result, it is possible to utilize the above mentioned dyestuffs as indicators, more particularly for qualitative, volumetric and colorimetric analysis.

The new derivatives with suitably chosen substituents actually react with some metal ion with a change of color similar to that brought about by a change of the pH in the case of the initial dye.

The dyes produced according to the present invention are so-called metallochromic indicators which react with some metallic ions such as Cu, Ni, Cd, etc., with expressive color changes. Thus, metallochromic indicators can be used particularly in the complexometric analysis of metals and as specific reagents in colorimetric determination.

As compared to other known dyes, the substances of the present invention have the advantage of high specificity combined with an unusually sensitive and a brilliant, easily observable change of color. With the help of the metallochromic indicators of the present invention, it is for example possible to determine the presence of even $10^{-6}$ mols of copper.

Theoretically, the mentioned properties of the metallochromic indicators of the present invention can be explained by the fact that a chelate-forming side chain $CH_2NR_1R_2$ in ortho position to the phenolic hydroxyl of the dye is joined to the resonant system of the molecule of the dye proper, that is the parent dye. This structure then forms very stable undissociated complexes with metallic ions and the forming of the complexes is accompanied by a marked change of color.

The following examples are given to further illustrate the present invention. The scope of the invention is not however meant to be limited to the specific details of the examples.

*Example 1*

3.56 parts by weight of sarcosine $(CH_3—NH—CH_2COOH)$ are dissolved together with 9.30 parts by weight of thymol blue

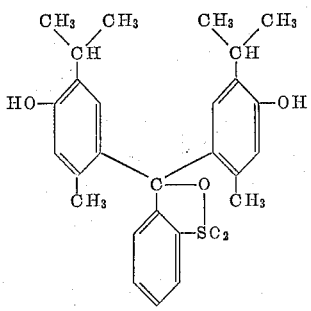

and 5.5 parts by weight of crystallized sodium acetate in 50 parts of glacial acetic acid. 4.4 parts by weight of an aqueous 37% formaldehyde solution are then added to the resulting solution and the reaction mixture is heated to a temperature of 50–75° C. until a sample of the reaction product after dilution with water and acidification no longer gives a red tint.

The acetic acid is then distilled off under vacuum, the remaining product is stirred with a small amount of ethanol and the sodium salt of the substituted sulfonphthalein dye is precipitated by addition of acetone. Instead of acetone, it is possible to use another water miscible solvent such as dioxane, tetrahydrofurane or the like.

*Example II*

4.60 parts by weight of proline

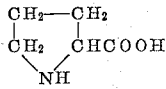

along with 5.5 parts by weight of crystallized sodium acetate and 9.3 parts by weight of thymol blue are heated together with 4.4 parts by weight of concentrated aqueous formaldehyde solution and 50 parts by weight of glacial acetic acid in a closed vessel to a temperature of 50–80° C. until a sample of the reaction mixture does not turn red on dilution with water and acidification. The solution of the reaction product is then concentrated under vacuum and the substituted sulfonphthalein dyestuff is isolated as described in Example I.

*Example III*

4.62 parts by weight of dl-serine

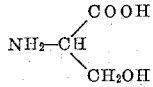

along with 5.9 parts by weight of crystallized sodium acetate and 9.3 parts by weight of thymol blue are dissolved in 50 parts by weight of glacial acetic acid. 6 parts by weight of a concentrated aqueous formaldehyde solution are then added to the reaction mixture. Further condensation and isolation are effected in the manner described in Example I.

*Example IV*

6.94 parts by weight of the hydrochloride of cysteine

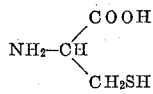

along with 11.92 parts by weight of crystallized sodium acetate and 9.3 parts by weight of thymol blue are dissolved in 50 parts by weight of glacial acetic acid with the addition thereto of 6 parts by weight of a 35% aqueous formaldehyde solution. The condensation is effected as described in Example I.

*Example V*

4.13 parts by weight of dl-alpha-aminoisobutyric acid

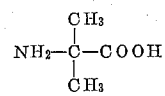

along with 5.5 parts by weight of crystallized sodium acetate and 9.3 parts by weight of thymol blue are heated as in the previous examples with 50 parts by weight of glacial acetic acid and 5 parts by weight of concentrated aqueous formaldehyde solution. The reaction mixture is concentrated and the substituted sulfonphthalein dyestuff is isolated as described in Example I.

*Example VI*

4.13 parts by weight of dl-alpha-aminoisobutyric acid along with 5.5 parts by weight of crystallized sodium acetate and 7.6 parts by weight of cresol red

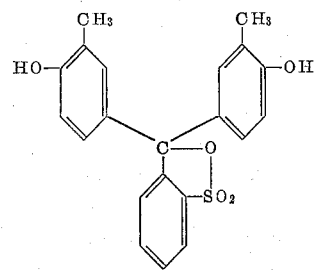

are dissolved in 50 parts by weight of glacial acetic acid. 6 parts by weight of concentrated aqueous formaldehdye solution are then added. The condensation and isolation of the final product are carried out in the same manner as described in the foregoing examples.

*Example VII*

4.63 parts by weight of diethanolamine

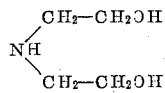

along with 5.99 parts by weight of crystallized sodium acetate and 9.3 parts by weight of thymol blue are subjected to a condensation with the addition of 6 parts by weight of concentrated aqueous formaldehyde solution and 50 parts by weight of glacial acetic acid as described above. The isolation of the condensation product is carried about by pouring the same into 700 parts of ice water, whereby the substituted sulfonphthalein dyestuff is separated out as a substance of low solubility.

*Example VIII*

3.98 parts by weight of beta-alanine

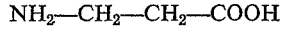

and 5.5 parts by weight of crystallized sodium acetate and 9.3 parts by weight of thymol blue are dissolved in 50 parts by weight of glacial acetic acid. 6 parts by weight of concentrated aqueous formaldehyde solution are then added and the resulting solution is submitted to condensation as described above. Upon completion of the condensation reaction the reaction mixture is diluted with a small amount of methanol and introduced under stirring into ice water. The separated insoluble by-products are filtered off and the filtrate is evaporated to dryness under vacuum. The residue after separation is then dissolved in a minimum amount of ethanol, the substituted sulfonphthalein dyestuff being precipitated in the form of its sodium salt by the addition of acetone. Instead of acetone it is possible to use another weakly polar solvent.

Example IX 2.9 parts by weight of thymolphthalein

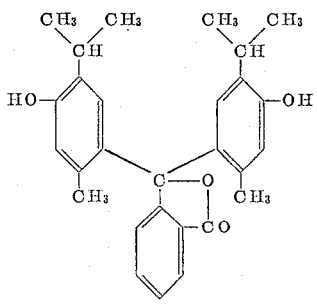

along with 1.38 parts by weight of alpha-aminoisobutyric acid and 1.83 parts by weight of crystalline sodium acetate are dissolved in 17 parts by weight of glacial acetic acid. 1.7 parts by weight of an aqueous 37% solution of formaldehyde are added to the solution and the reaction mixture is heated in a closed vessel for 24 hours at a temperature of 50–75° C. The reaction mixture is then cooled and the substituted phthalein dyes are precipitated by pouring them into 900 parts of ice water, whereupon the dye is filtered off under suction and dried.

Example X 6.6 parts by weight of fluorescein

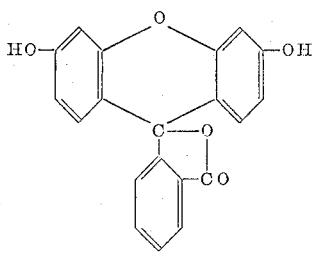

along with 4.2 parts by weight of serine, 5.5 parts by weight of crystalline sodium acetate and 5 parts by weight of 37% aqueous formaldehyde are dissolved in 50 parts by weight of glacial acetic acid. The reaction mixture is heated in a closed vessel at a temperature of 50–80° C. for 24 hours. After cooling, the reaction mixture is, under continuous stirring, introduced into 800 parts by weight of ethanol and the precipitated phthalein dyestuff is filtered off under suction and dried.

Example XI 6.9 parts by weight of o-cresolphthalein

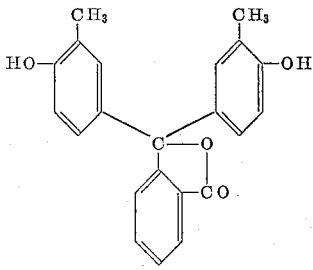

are dissolved in 10 parts of sodium hydroxide, 8 parts of water and 24 parts of ethanol. A saturated solution prepared from 4.6 parts by weight of proline is added to this solution.

After thorough mixing together of the components 5 parts of 37% aqueous solution of formaldehyde are added at one time and the mixture is heated to a temperature of up to 70° C. for a period of 4 hours. The reaction mixture is cooled and after dilution by the same volume of water is precipitated by hydrochloric acid, filtered off under suction and dried. The crude product is purified by a repeated precipitation by hydrochloric acid from the solution thereof in an alkaline hydroxide.

Example XII 7.5 parts by weight of xylenolphthalein

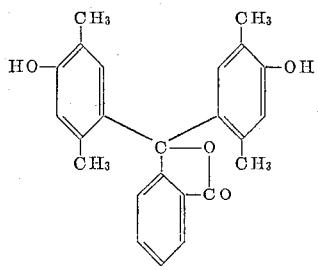

are boiled with 3.56 parts by weight of sarcosine, 5.5 parts by weight of crystalline sodium acetate, 3.3 parts by weight of paraformaldehyde in a solution of 20 parts by weight of glacial acetic acid and 80 parts by weight of ethanol under refluxing for a period of 4 hours. After cooling the reaction mixture is diluted with 400 parts by weight of ethanol and precipitated dyestuff, after being kept under refrigeration for 24 hours, is filtered off under suction and dried.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound of the formula:

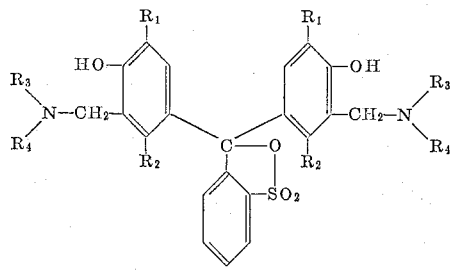

wherein $R_1$ is isopropyl; wherein $R_2$ is methyl; wherein $R_3$ is methyl and wherein $R_4$ is —$CH_2COOH$.

2. A compound of the formula:

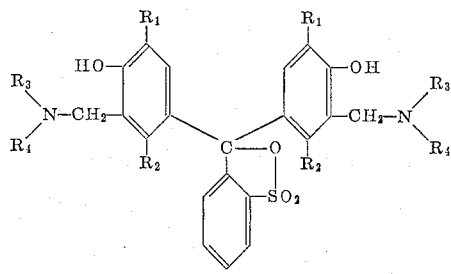

wherein $R_1$ is isopropyl; wherein $R_2$ is methyl; and wherein $R_3$ and $R_4$ together are the radical

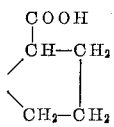

3. A compound of the formula:

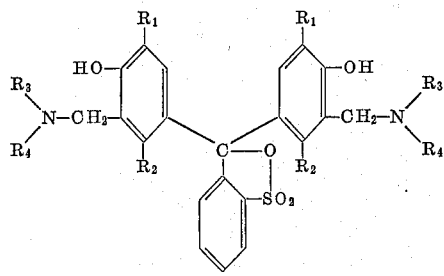

wherein $R_1$ is isopropyl; wherein $R_2$ is methyl; wherein $R_3$ is hydrogen; and wherein $R_4$ is

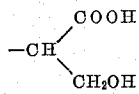

4. A compound of the formula:

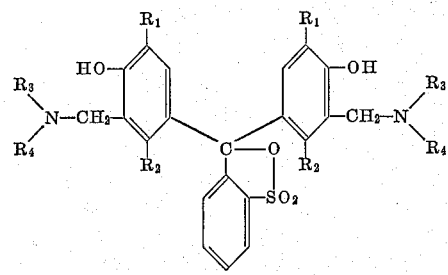

wherein $R_1$ is isopropyl; wherein $R_2$ is methyl; wherein $R_3$ is hydrogen; and wherein $R_4$ is

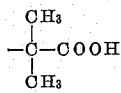

5. A compound of the formula:

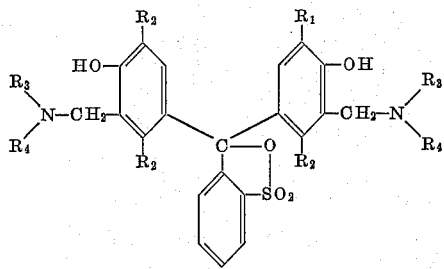

wherein $R_1$ is methyl; wherein $R_2$ is hydrogen; wherein $R_3$ is hydrogen; and wherein $R_4$ is

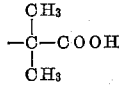

6. A compound of the formula:

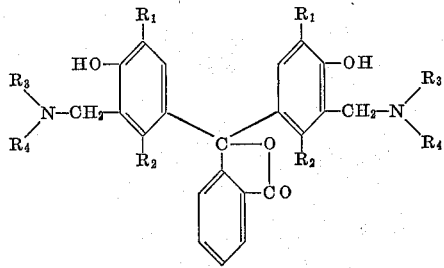

wherein $R_1$ is isopropyl; wherein $R_2$ is methyl; wherein $R_3$ is hydrogen; and wherein $R_4$ is

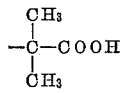

7. A compound of the formula:

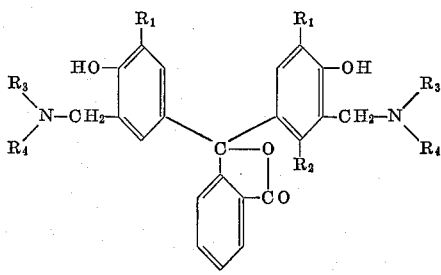

wherein $R_1$ is methyl; wherein $R_2$ is hydrogen; and wherein $R_3$ and $R_4$ together are the radical

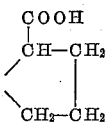

8. A compound of the formula:

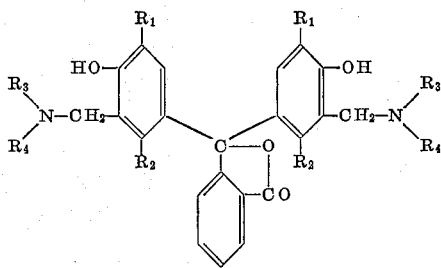

wherein $R_1$, $R_2$, and $R_3$ are each methyl; and wherein $R_4$ is —$CH_2$—COOH.

References Cited by the Examiner

UNITED STATES PATENTS

| | | | |
|---|---|---|---|
| 499,927 | 6/1893 | Monnet | 260—343.4 |
| 2,745,720 | 5/1956 | Schwarzenbach et al. | 260—327 |
| 2,980,696 | 4/1961 | Korbl | 260—327 |

FOREIGN PATENTS 1,211,536  10/1959  France.

OTHER REFERENCES

Korbl et al.: Chemistry and Industry (London), 1957, pages 233–34.

Korbl et al.: Chemistry and Ind. (London), 1957, pages 1624–25.

WALTER A. MODANCE, *Primary Examiner.*

JOHN D. RANDOLPH, H. J. LIDOFF, *Examiners.*

JOHN T. MILLER, JAMES A. PATTEN,
*Assistant Examiners.*